United States Patent
Fu et al.

(10) Patent No.: US 11,758,528 B2
(45) Date of Patent: Sep. 12, 2023

(54) SYSTEM AND METHOD FOR COMMON AND UE-SPECIFIC FREQUENCY RESOURCE SCHEDULING

(71) Applicant: Samsung Electronics Co., Ltd, Suwon-si (KR)

(72) Inventors: Jingxing Fu, Beijing (CN); Bin Yu, Beijing (CN); Chen Qian, Beijing (CN); Qi Xiong, Beijing (CN); Chenxi Hao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/646,107

(22) Filed: Dec. 27, 2021

(65) Prior Publication Data

US 2022/0124716 A1 Apr. 21, 2022

Related U.S. Application Data

(63) Continuation of application No. 16/305,856, filed as application No. PCT/KR2017/005611 on May 30, 2017, now Pat. No. 11,212,799.

(30) Foreign Application Priority Data

May 30, 2016 (CN) .......................... 201610371842.7
Nov. 16, 2016 (CN) .......................... 201611008262.8
(Continued)

(51) Int. Cl.
*H04L 5/00* (2006.01)
*H04W 72/04* (2023.01)
(Continued)

(52) U.S. Cl.
CPC ........... *H04W 72/0453* (2013.01); *H04L 5/00* (2013.01); *H04W 72/23* (2023.01)

(58) Field of Classification Search
CPC ....... H04L 1/0038; H04L 5/00; H04L 5/0053; H04L 5/0092; H04L 5/0094; H04W 72/042; H04W 72/0453; H04W 72/1289
See application file for complete search history.

(56) References Cited

U.S. PATENT DOCUMENTS 9,848,294 B2    12/2017  Li et al.
11,212,799 B2*  12/2021  Fu ..................... H04W 72/0453
(Continued)

FOREIGN PATENT DOCUMENTS

CN    102186251 A    9/2011
CN    102347919 A    2/2012
(Continued)

OTHER PUBLICATIONS

International Search Report dated Sep. 12, 2017 in connection with International Patent Application No. PCT/KR2017/005611, 5 pages.
(Continued)

*Primary Examiner* — Melvin C Marcelo
*Assistant Examiner* — Natali Pascual Peguero

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure provides a resource scheduling method, which includes: determining, by a UE, a resource allocation indicating way in DCI of a first type search space and a resource allocation indicating way in DCI of a second type search space, performing, by the UE, blind detection for PDCCH/EPDCCH on the bandwidth and the location of all the frequency resources available for the UE frequency resource allocation in the corresponding resource allocation indicating way according to the allocation unit of the UE frequency resource in the corresponding resource allocation indicating way, determining a bandwidth and a location of
(Continued)

an uplink resource and/or a downlink resource actually allocated for the UE.

10 Claims, 4 Drawing Sheets

(30) Foreign Application Priority Data

Mar. 14, 2017 (CN) .......................... 201710149997.0
May 24, 2017 (CN) .......................... 201710373245.2

(51) Int. Cl.
*H04W 72/0453* (2023.01)
*H04W 72/23* (2023.01)

(56) References Cited

U.S. PATENT DOCUMENTS

| | | |
|---|---|---|
| 2011/0085513 A1 | 4/2011 | Chen et al. |
| 2012/0320846 A1 | 12/2012 | Papasakellariou et al. |
| 2013/0250880 A1 | 9/2013 | Liao et al. |
| 2014/0177582 A1 | 6/2014 | Wu et al. |
| 2015/0049700 A1 | 2/2015 | Liu et al. |
| 2015/0195823 A1 | 7/2015 | Seo et al. |
| 2015/0208347 A1 | 7/2015 | Iiyama et al. |
| 2015/0208387 A1 | 7/2015 | Awad et al. |
| 2016/0037498 A1 | 2/2016 | Chen et al. |
| 2017/0135105 A1 | 5/2017 | Li et al. |

FOREIGN PATENT DOCUMENTS

| | | |
|---|---|---|
| CN | 102550108 A | 7/2012 |
| CN | 103609084 A | 2/2014 |
| CN | 103716823 A | 4/2014 |
| CN | 103843431 A | 6/2014 |
| CN | 104521306 A | 4/2015 |
| CN | 104885513 A | 9/2015 |
| CN | 105099634 A | 11/2015 |
| WO | 2013/008958 A1 | 1/2013 |
| WO | 2013107250 A1 | 7/2013 |
| WO | 2013174167 A1 | 11/2013 |

OTHER PUBLICATIONS

Written Opinion of the International Searching Authority dated Sep. 12, 2017 in connection with International Patent Application No. PCT/KR2017/005611, 6 pages.
Samsung, "Resource Allocation Aspects", 3GPP TSG RAN WG1 Meeting #88bis, Apr. 3-7, 2017, 6 pages.
"3rd Generation Partnership Project; Technical Specification Group Radio Access Network; Evolved Universal Terrestrial Radio Access (E-UTRA); Physical layer procedures (Release 13)", 3GPP TS 36.213 v13.1.1 (Mar. 2016), Mar. 31, 2016, 216 pages.
Nabil et al., "Scattered Search Space for PDCCH and ePDCCH in LTE-Advanced", 2015 7th International Congress on Ultra Modern Telecommunications and Control Systems and Workshops (ICUMT), Dec. 31, 2015, 6 pages.
Notice of Preliminary Rejection dated Sep. 14, 2021 in connection with Korean Patent Application No. 10-2018-7035471, 10 pages.
Notice of Grant of Patent dated Dec. 3, 2021 in connection with Korean Patent Application No. 10-2018-7035471, 4 pages.
Office Action dated Apr. 2, 2020 in connection with Chinese Patent Application No. 201710373245.2, 28 pages.
Office Action dated Dec. 24, 2020 in connection with Chinese Patent Application No. 201710373245.2, 14 pages.
China National Intellectual Property Administration, "Office Action," dated Apr. 21, 2023, in connection with Chinese Patent Application No. CN202111022603.8, 13 pages.
AH Chairman, "Summary of AH on AI 6.3.4 UE Procedures for downlink shared channel", 3GPP TSG RAN WG1 Meeting #52 R1-081137, Sorrento, Italy, Feb. 11-15, 2008, 7 pages.

* cited by examiner

SYSTEM AND METHOD FOR COMMON AND UE-SPECIFIC FREQUENCY RESOURCE SCHEDULING

CROSS-REFERENCE TO RELATED APPLICATIONS

This application is a continuation of application Ser. No. 16/305,856, now U.S. Pat. No. 11,212,799, which is a 371 of International Application No. PCT/KR2017/005611 filed on May 30, 2017, which claims priority to Chinese Patent Application No. 201610371842.7 filed on May 30, 2016, Chinese Patent Application No. 201611008262.8 filed on Nov. 16, 2016, Chinese Patent Application No. 201710149997.0 filed on Mar. 14, 2017 and Chinese Patent Application No. 201710373245.2 filed on May 24, 2017, the disclosures of which are herein incorporated by reference in their entirety.

BACKGROUND

1. Field

The present disclosure relates to radio communication technical fields, and more particularly, to a resource scheduling method and apparatus.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

The present disclosure provides a resource scheduling method and apparatus, in a condition that a UE cannot support the entire system bandwidth, an uplink resource and a downlink resource allocated by a base station can still be appropriately determined.

In order to improve the intention above, the present disclosure provides technical solutions as follows.

A resource scheduling method includes determining, by a user equipment (UE), a resource allocation indicating way in downlink control information (DCI) of a first type search space and a resource allocation indicating way in DCI of a second type search space, wherein the resource allocation indicating way includes an allocation unit of a UE frequency resource and a bandwidth and a location of all frequency resources available for UE frequency resource allocation, in the first type search space and the second type search space, performing, by the UE, blind detection for Physical Downlink Control Channel (PDCCH)/Enhanced Physical Downlink Control Channel (EPDCCH) on the bandwidth and the location of all the frequency resources available for the UE frequency resource allocation in the corresponding resource allocation indicating way according to the allocation unit of the UE frequency resource in the corresponding resource allocation indicating way, determining a bandwidth and a location of an uplink resource and/or a downlink resource actually allocated for the UE.

Preferably, the UE determining the resource allocation indicating way in the DCI of the first type search space includes determining, by the UE, the resource allocation indicating way in the DCI of the first type search space according to common signaling and initial access information transmitted by a base station, or, determining by the UE, the bandwidth and the location of all the frequency resources available for the UE frequency resource allocation in the DCI of the first type search space according to the common signaling and the initial access information transmitted by the base station, and determining the allocation unit of the UE frequency resource in the DCI of the first type search space through pre-configuration, or, determining, by the UE, the resource allocation indicating way in the DCI of the first type search space according to the pre-configuration.

Preferably, the UE determining the resource allocation indicating way in the DCI of the second type search space includes determining, by the UE, the resource allocation indicating way in the DCI of the second type search space according to higher layer signaling transmitted by the base station, or, determining by the UE, the bandwidth and the location of all the frequency resources available for the UE frequency resource allocation in the DCI of the second type search space according to higher layer signaling transmitted by the base station, and determining the allocation unit of the UE frequency resource in the DCI of the second type search space through the pre-configuration, or, for the DCI of a fallback transmission mode, determining, by the UE, the resource allocation indicating way in the DCI of the second type search space according to the common signaling or the initial access information transmitted by the base station, or determining the resource allocation indicating way in the DCI of a specific search space same as the resource allocation indicating way in the DCI of the first type search space; for the DCI of a non-fallback transmission mode, determining, by the UE, the resource allocation indicating way in the DCI of the second type search space according to the higher layer signaling transmitted by the base station, or determining the bandwidth and the location of all the frequency resources available for the UE frequency resource allocation in the DCI of the second type search space according to the higher layer signaling transmitted by the base station, and determining the allocation unit of the UE frequency resource in the DCI of the second type search space through the pre-configuration, or, determining the resource allocation indicating way in the DCI of the specific search space same as the resource allocation indicating way in the DCI of the first type search space.

Preferably, when the UE does not determine the resource allocation indicating way in the DCI of the second type search space, the UE determines the resource allocation indicating way in the DCI of the specific search space same as the resource allocation indicating way in the DCI of the first type search space.

Preferably, the UE determining the resource allocation indicating way in the DCI of the first type search space and the resource allocation indicating way in the DCI of the second type search space includes receiving, by the UE, the common signaling or the initial access information transmitted by the base station, determining frequency information of two or more than two resource allocations, wherein the frequency information includes bandwidths and locations of all frequency resources for the resource allocations, using one of the two or more than two resource allocations for the first type search space according to the common signaling or the initial access information, taking a bandwidth and a location of all frequency resources for the resource allocation as the bandwidth and the location of all the frequency resources available for the UE frequency resource allocation in the DCI of the first type search space, selecting a resource allocation for the second type search space from the two or more than two resource allocations according to a preset regulation, taking a bandwidth and a location of all the frequency resources for the resource allocation as the bandwidth and the location of all the frequency resources available for the UE frequency resource allocation in the DCI of the second type search space.

Preferably, when the resource allocation indicating way for the first type search space and the resource allocation indicating way for the first type search space are determined, the UE determines the allocation unit of the UE frequency resource in the DCI of the first type search space and/or the second type search space according to the pre-configuration.

Preferably, the frequency information includes the allocation unit of the UE frequency resource, when the resource allocation indicating way for the first type search space and the resource allocation indicating way for the second type search space are determined, the UE takes the allocation unit of the UE frequency resource used in the resource allocation for the first type search space as the allocation unit of the UE frequency resource in the DCI of the first type search space; and/or takes the allocation unit of the UE frequency resource used in the resource allocation for the second type search space as the allocation unit of the UE frequency resource in the DCI of the second type search space.

Preferably, the UE determining the resource allocation indicating way in the DCI of the first type search space and the resource allocation indicating way in the DCI of the first type search space includes receiving, by the UE, the common signal or the initial access information transmitted by the base station, determining the frequency information of two or more resource allocations, wherein the frequency information includes the bandwidths and the locations of all frequency resource for the resource allocations, using, by the UE, one of the two or more than two resource allocations for the first type search space, and taking the bandwidth and the location of all the frequency resource of the resource allocation as the bandwidth and the location of all the frequency resource available for the UE frequency resource in the DCI of the first type search space, when the DCI of the UE specific search space is the DCI of the fallback transmission mode, determining the resource allocation indicating way in the DCI of the UE specific search space same as the resource allocation indicating way in the DCI of the first type search space; when the DCI of the UE specific search space is the DCI of the non-fallback transmission mode, select a resource allocation used for the second type search space from the two or more than two resource allocations according to the preset regulation, taking the bandwidth and the location of all the frequency resources for the resource allocation as the bandwidth and the location of all the frequency resources available for the UE frequency resource allocation in the DCI of the second type search space.

Preferably, when the resource allocation indicating way in the DCI of the first type search space is determined, the UE determines the allocation unit of the UE frequency resource allocation in the DCI of the first type search space according to the pre-configuration, and/or, when the resource allocation indicating way in the DCI of the second type search space is determined and the DCI of the second type search space is the non-fallback transmission mode, the UE determines the allocation unit of the UE frequency resource allocation in the DCI of the second type search space according to the pre-configuration.

Preferably, the frequency information includes the allocation unit of the UE frequency resource, when the resource allocation indicating way for the first type search space and the resource allocation indicating way for the second type search space are determined, the UE takes the allocation unit of the UE frequency resource used in the resource allocation for the first type search type as the allocation unit of the UE frequency resource in the DCI of the first type search space; and/or, when the DCI of the second type search space is the non-fallback transmission mode, the UE takes the allocation unit of the UE frequency resource used in the resource allocation for the second type search type as the allocation unit of the UE frequency resource in the DCI of the second type search space.

Preferably, the preset regulation includes that the resource allocation the bandwidth of all the frequency resources of which is largest, and is smaller than or equal to the largest frequency bandwidth supported by the UE.

Preferably, before the UE determines the resource allocation indicating way in the DCI of the first type search space, further comprising: determining at least one sub-bandwidth indicated in the DCI of the first type search space; wherein the determining the resource allocation indicating way in the DCI of the first type search space comprises: determining a resource allocation indicating way in each sub-bandwidth indicated by the DCI of the first type search space, and/or, before the UE determines the resource allocation indicating way in the DCI of the second type search space, further comprising: determining at least one sub-bandwidth indicated in the DCI of the second type search space; wherein the determining the resource allocation indicating way in the DCI of the second type search space comprises: determining a resource allocation indicating way in each sub-bandwidth indicated by the DCI of the second type search space.

Preferably, before the UE determines the resource allocation indicating way in the DCI of the first type search space, further comprising: determining, by the UE, whether a one-step way or a two-step way is used for indicating a frequency resource in the DCI of the first type search space according to received system information indication or received high layer signaling configuration; when determining that the one-step way is used, directly performing the way that the UE determines the resource allocation indicating way in the DCI of the first type search space; when determining that the two-step way is used, before the UE determines the resource allocation indicating way in the DCI of the first type search space, determining the at least one sub-bandwidth indicated in the DCI of the first type search space, wherein the determining the resource allocation indicating way in the DCI of the first type search space comprises: determining a resource allocation indicating way in each sub-bandwidth indicated by the DCI of the first type search space, and/or, before the UE determines the resource allocation indicating way in the DCI of the second type search space, further comprising: determining, by the UE, whether a one-step way or a two-step way is used for indicating a frequency resource in the DCI of the second type search space according to received system information indication or high layer signaling configuration; when determining that the one-step way is used, directly performing the way that the UE determines the resource allocation indicating way in the DCI of the second type search space; when determining that the two-step way is used, before the UE determines the resource allocation indicating way in the DCI of the second type search space, determining the at least one sub-bandwidth indicated in the DCI of the second type search space, wherein the determining the resource allocation indicating way in the DCI of the second type search space comprises: determining the resource allocation indicating way in each sub-bandwidth indicated in the DCI of the second type search space.

Preferably, when the DCI of the second type search space is DCI with a backoff mode, before the UE determines the resource allocation indicating way in the DCI of the second type search space, further comprising: determining the at least one sub-bandwidth indicated in the DCI of the second type search space; wherein the determining the resource allocation indicating way in the DCI of the second type search space comprises: determining a resource allocation indicating way in each sub-bandwidth indicated in the DCI of the second type search space, and/or, when the DCI of the second type search space is DCI with a backoff mode, before the UE determines the resource allocation indicating way in the DCI of the second type search space, further comprising: determining, by the UE, whether a one-step way or a two-step way is used for indicating a frequency resource in the DCI of the second type search space according to received system information indication or received high layer signaling configuration; when determining that the one-step way is used, directly performing the way that the UE determines the resource allocation indicating way in the DCI of the second type search space; when determining that the two-step way is used, before the UE determines the resource allocation indicating way in the DCI of the second type search space, determining the at least one sub-bandwidth indicated in the DCI of the second type search space, wherein the determining the resource allocation indicating way in the DCI of the second type search space comprises: determining the resource allocation indicating way in each sub-bandwidth indicated in the DCI of the second type search space.

Preferably, wherein the number of PRBs and locations of the PRBs included in the at least one sub-bandwidth in the DCI of the first type search space or in the DCI of the second type search space are preset, or are indicated by system information, or are determined according to system bandwidth.

The present disclosure provides a resource scheduling apparatus, which includes an indicating way determining module, a blind detecting module and an actual resource determining module. The indicating way determining module is configured to determine a resource allocation indicating way in downlink control information (DCI) of a first type search space and a resource allocation indicating way in the DCI of a second type search space, wherein the resource allocation indicating way includes an allocation unit of a UE frequency resource and a bandwidth and a location of all frequency resources available for UE frequency resource allocation. The blind detecting module is configured to in the first type search space and the second type search space, perform blind detection for Physical Downlink Control Channel (PDCCH)/Enhanced Physical Downlink Control Channel (EPDCCH) on the bandwidth and the location of all the frequency resources available for the UE frequency resource allocation in the corresponding resource allocation indicating way according to the allocation unit of the UE frequency resource in the corresponding resource allocation indicating way. And the actual resource determining module is configured to determine a bandwidth and a location of an uplink resource and/or a downlink resource actually allocated for the UE.

It can be seen from above that, according to the present disclosure, a UE determines a resource allocation indicating way in DCI of a first type search space and a resource allocation indicating way in DCI of a second type search space, wherein the resource allocation indicating way includes an allocation unit of a UE frequency resource and a bandwidth and a location of all frequency resources available for UE frequency resource allocation; in the first type search space and the second type search space, the UE performs blind detection for PDCCH/EPDCCH on the bandwidth and the location of all the frequency resources available for the UE frequency resource allocation in the corresponding resource allocation indicating way according to the allocation unit of the UE frequency resource in the corresponding resource allocation indicating way, determining a bandwidth and a location of an uplink resource and/or a downlink resource actually allocated for the UE. According to the technical solution above, the resource allocation indicating way is firstly determined, and then the blind detection is performed for the PDCCH/EPDCCH according to the resource allocation indicating way, so that when the UE cannot support the entire system bandwidth, the UE can still determine the range and the unit for the blind detection according to the resource allocation indicating way, and can appropriately determine the uplink resource and the downlink resource allocated by the base station.

The present disclosure is to provide an apparatus and method for resource scheduling. Thus, it is possible to provide an apparatus and method for resource scheduling in a condition that a terminal in a wireless communication system cannot support the entire system bandwidth.

DETAILED DESCRIPTION

In order to make the object, technical solution and merits of the present invention clearer, the present invention will be illustrated in detail hereinafter with reference to the accompanying drawings and specific examples.

Figure 1:
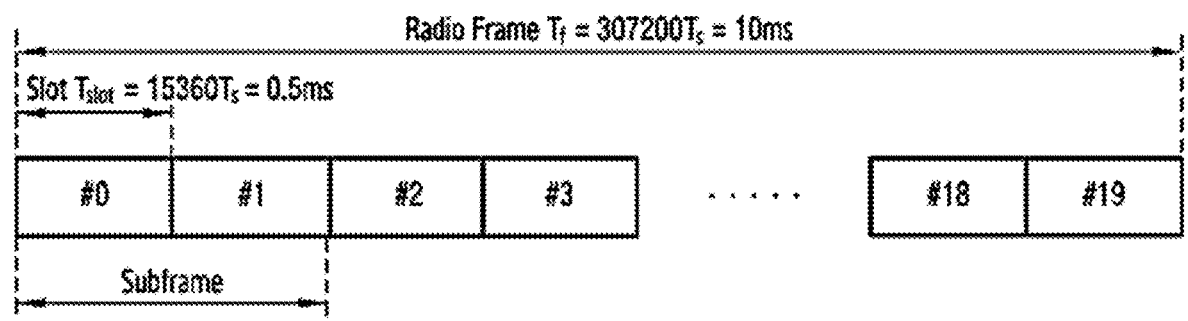
FIG. 1 is a schematic diagram illustrating a structure of a frame in a frequency division duplex (FDD) system.

In a Long Term Evolution Advanced (LTE-A) system, a length of each radio frame is 10 ms, and the radio frame is equally divided into 10 subframes. A downlink Transmission Time Interval (TTI) is defined in a subframe. FIG. 1 is a schematic diagram illustrating a structure of a frame in a Frequency Division Duplex (FDD) system. As shown in FIG. 1, each downlink frame includes two slots, for a normal Cyclic Prefix (CP) length, each slot includes 7 Orthogonal Frequency Division Multiplexing (OFDM) symbols, for an extended CP length, each slot PDCCH/EPDCCH includes 6 OFDM symbols.

Figure 2:
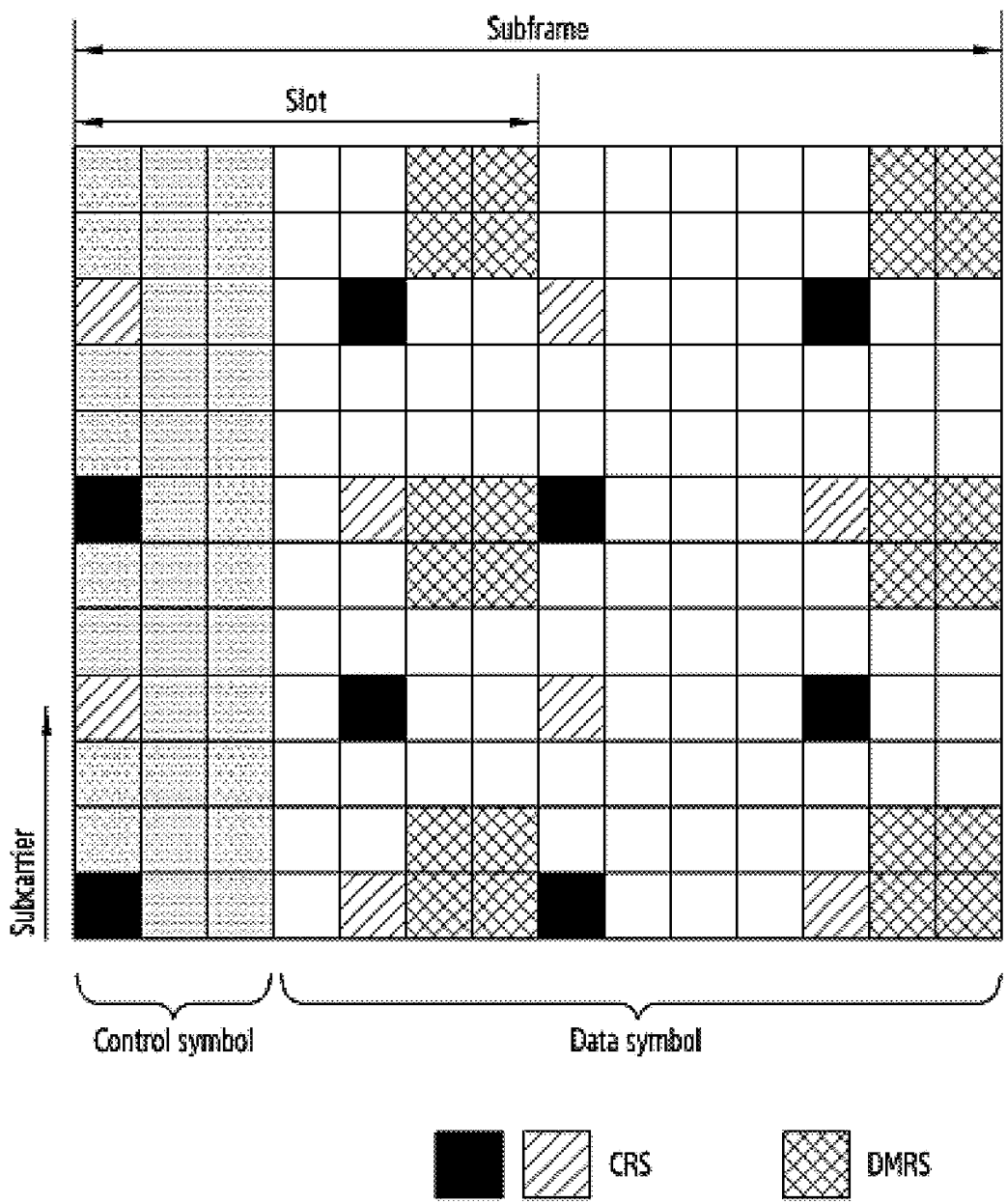
FIG. 2 is a schematic diagram illustrating a structure of a subframe in a LTE system.

FIG. 2 is a schematic diagram illustrating a structure of a subframe in a LTE system. As shown in FIG. 2, first n OFDM symbols, n=1, 2 or 3, are used for downlink control information transmission, which includes a Physical Downlink Control Channel (PDCCH) and other control information; additional OFDM symbols are used for Physical Downlink Shared Channel (PDSCH) transmission. A basic granularity for a resource allocation is a Physical Resource Block (PRB) pair, and a PRB includes 12 successive sub carriers in frequency, and corresponds to a slot in time. Two PRBs in two slots in a same subframe in a frame are referred to as a PRB pair. In each PRB pair, each resource element (RE) is a minimum unit of time-frequency resources, i.e., each RE is a subcarrier in frequency, and is an OFDM symbol in time. The RE can be used for different functions, e.g., a part of REs can be respectively used for Cell-specific Reference Signal (CRS) transmission, Demodulation Reference Signal (DMRS) transmission, Channel State Information-Reference Signal (CSI-RS) transmission, PDCCH transmission, PDSCH transmission, etc.

In LTE system, the PDSCH transmission and the PUSCH transmission are scheduled through a PDCCH or an Enhanced Physical Downlink Control Channel (EPDCCH), where resources for the PDSCH transmission and the PUSCH transmission are allocated through resource allocation signaling in Downlink Control Information (DCI) carried in the PDCCH/EPDCCH, a maximum resource allocated for the PDSCH transmission and the PUSCH transmission is all PRB pairs in the entire system bandwidth, a minimum resource allocated for the PDSCH transmission and the PUSCH transmission is a PRB pair. The number of bits of the resource allocation signaling in the PDCCH/EPDCCH is calculated according to the number of the PRB pairs in the entire system bandwidth. For example, when the system bandwidth is 10 MHz, the number of the PRB pairs is equal to 50, and the number of the bits of the resource allocation signaling used in the PDCCH/EPDCCH is calculated according to different resource allocation methods regarding that the number of the PRB pairs is equal to 50.

In LTE system, for the PDCCH transmission, a common search space and a UE specific search space are defined. All UEs can perform demodulation and decoding in the common search space, and only specific UEs can perform demodulation and decoding in the UE specific search space. A process of tracking the PDCCH is performed by trying to perform demodulation and decoding (i.e., blind detection) for common search spaces of all candidate PDCCHs and a UE specific search common set, performing check through Cyclic Redundancy Check (CRC) scrambled by a Radio Network Temporary Indicator (RNTI) (e.g., C-RNTI), and searching out the PDCCH scheduled by a base station. The number of candidate PDCCHs of the common search space and UE specific search space is as shown in Table 1. The common search spaces include search spaces aggregation levels of which are 4 and 8 Control Channel Elements (CCE). The UE specific search spaces include search spaces aggregation levels of which are 1, 2, 4 and 8 Control Channel Elements (CCE). For each transmission mode, the UE tracks two different sizes of DCI formats. Thus, for the common search space, the UE tracks 2*(4+2)=12 candidate PDCCHs; for the UE specific search space, the UE tracks 2*(6+6+2+2)=32 candidate PDCCHs, where one type is a fallback DCI format, e.g., DCI format 1A, another type is a normal DCI format, e.g., DCI format 1B/1D/2/2A. The scheduling described above is PDSCH scheduling. Further, the scheduling described below is PUSCH scheduling. The PUSCH may be scheduled through the PDCCH in the common search space, or may be scheduled through the PDCCH in the UE specific search space.

TABLE 1

| | Search Space $S_k^{(L)}$ | | The number of |
|---|---|---|---|
| Type | Aggregation Level L | Size [the number of CCEs] | candidate PDCCHs $M^{(L)}$ |
| UE Specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The UE specific search space is associated with a user's RNTI and a subframe index, i.e., after the user's RNTI of the UE is determined, the location of the CCEs occupied by the UE in the UE specific search space in the specific subframe is determined.

In LTE system, the UE capability may support the entire system bandwidth. Thus, when determining uplink data resources and downlink data resources actually allocated, the UE may perform blind detection in the entire frequency range in the common search space and the UE specific search space. However, in a new radio (NR) access technology, as the frequency bandwidth is largely improved, the system bandwidth is largely improved accordingly. However, some UEs may not support such large system bandwidth, and different UEs may support different maximum system bandwidths. According to the present disclosure, uplink and downlink data scheduling methods are researched in conditions that the supported system bandwidths are different.

Figure 3:
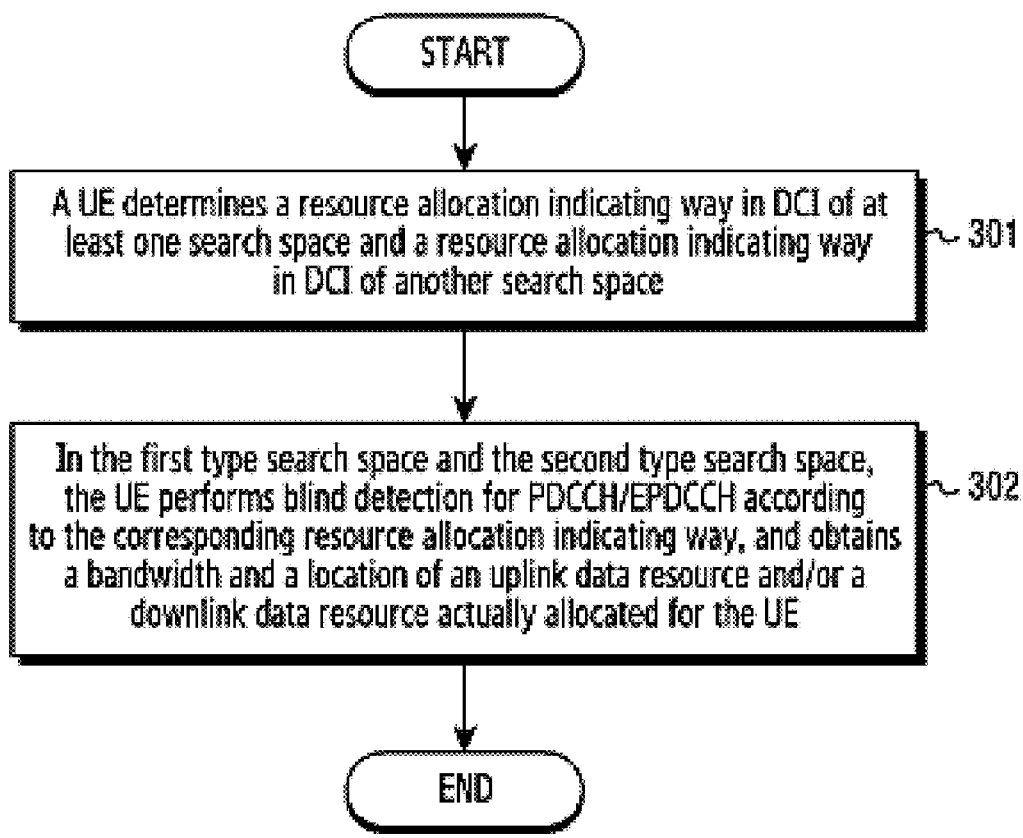
FIG. 3 is a basic flowchart illustrating an uplink and downlink resource scheduling method according to the present disclosure.

In order to implement an intention of the present disclosure, the present disclosure provides a resource scheduling method. As shown in FIG. 3, the method includes procedures as follows. Herein, the UE may be referred as 'a terminal' and so on.

At block 301, a UE determines a resource allocation indicating way in DCI of at least one search space (referred to as a first type search space herein, e.g., a common search space, this type search space is used to schedule System Information (SIBs), a PDSCH for random access (Msg2), etc.) and a resource allocation indicating way in DCI of another search space (referred to as a second type search space, e.g., a UE specific search space, a UE-group search space).

The resource allocation indication way includes a frequency resource allocation unit of the UE (e.g., referred to as a Resource Block Group (RBG), and a sub-carrier space) and bandwidth and locations of all frequency resources available for frequency resource allocation of the UE, e.g., the location of the frequency resource refers to a central frequency of the frequency resource.

At block 302, in the first type search space and the second type search space, the UE performs blind detection for PDCCH/EPDCCH according to the corresponding resource allocation indicating way, and obtains a bandwidth and a location of an uplink data resource and/or a downlink data resource actually allocated for the UE.

When the blind detection for the PDCCH/EPDCCH is performed, the UE performs the blind detection for the PDCCH/EPDCCH on the bandwidth and the location of all the frequency resources available for the UE resource allocation in the first type search space or the second type search space according to the determined allocation unit of the UE frequency resource. After the blind detection is performed, a way same as an existing way may be used during the processing of determining a resource actually allocated, which is not repeatedly described.

Technical solutions of the present disclosure are further described in detail according to preferable embodiments as follows.

Embodiment 1

In this embodiment, they are respectively described about how to determine the resource allocation indicating way in the DCI of the first type search space and how to determine the resource allocation indicating way in the DCI of the second type search space, so as to determine a DCI detection way in a corresponding search space.

How to determine the resource allocation way in the DCI of the first type search space is firstly described.

First Way:

For the bandwidth and the location of all the frequency resources available for the UE frequency resource allocation in the resource allocation indicating way, a determining way includes that the UE receives the common signaling (e.g., MIB, system information) or initial access information transmitted by a base station, obtains the bandwidth and the location of all the frequency resources available for the resource allocation in the DCI of the first type search space by receiving the common signaling or the initial access information. For example, according to the received common signaling or the common initial access information, the UE obtains that the system bandwidth available for the DCI of the first type search space is 110 PRBs, or 75 PRBs, or 50 PRBs, or 25 PRBs, or 15 PRBs, or 6 PRBs, the location of these PRBs may be deduced according to the locations of the synchronization signals, and the bandwidth of each PRB is 180 kHz.

For the allocation unit of the UE frequency resource in the resource allocation indicating way, there are two determining ways. One determining way is same as that described above, i.e., the UE receives the common signaling or the initial access information, and determines the allocation unit of the UE frequency resource through the common signaling or the initial access information; another determining way includes that the allocation unit of the UE frequency resource is determined according to pre-configuration, e.g., according to a specification; another determining way includes that the allocation unit of the UE frequency resource is determined according to the bandwidth of all the frequency resources for the resource allocation in the DCI of the first type search space.

The UE performs the blind detection for the PDCCH of the first type search space according to the resource allocation indicating way determined above, obtains the number and the location of the uplink resource and the number of the location of the downlink resource actually allocated for the UE.

Second Way:

Another determining way includes that the UE determines the resource allocation indicating way in the first type search space according to pre-configuration (e.g., a specification), in particular, includes a bandwidth (referred to as a common system bandwidth) and a location of all frequency resources in the first type search space, and the allocation unit of the UE frequency resource in the first type search space. For example, the system bandwidth available for the first type search space is preset as 110 PRBs according to the specification, the location of the 110 PRBs may be deduced according to the synchronization signal, and the bandwidth of each PRB is 180 kHz, and the allocation unit of the UE frequency resource in the DCI of the first type search space is further preset as 2PRBs pairs according to the specification. The UE performs the blind detection according to the information, and obtain the bandwidth and the location of the uplink resource and the bandwidth and the location of the downlink resource actually allocated for the UE. The number of the blind detections performed for the PDCCH/EPDCCH of the first type search space by the UE is obtained by receiving the common signaling and the initial access information, or is preset by the specification. A PDCCH/EPDCCH format of the PDCCH/EPDCCH which is blindly detected in the first type search space (including the number of bits included in the PDCCH/EPDCCH) is indicated by the common signaling, or is obtained through the initial access information, or is preset through a specification.

The resource allocation indicating way in the DCI of the second type search space is described below, and the second type search space may be used for the UE specific search space, or may be used for the UE-group search space.

First Way:

For the bandwidth and the location of all the frequency resources available for the UE frequency resource allocation in the resource allocation indicating way, a first determining way includes that the UE receives higher layer signaling transmitted by the base station, obtains the bandwidth (which may be referred to as the UE specific system bandwidth) and the location of all the frequency resources available for the resource allocation in the DCI of the second search space. For example, the configuration information through the higher layer signaling indicates that the system bandwidth available for the DCI of the second type search space is 110 PRBs, the configuration information through the higher layer signaling further indicates the location of these 110 PRBs, and the bandwidth of each PRB is 180 kHz.

For the allocation unit of the UE frequency resource in the resource allocation indicating way, there are two determining ways. One determining way is same as that described above, i.e., the UE receives the higher layer signaling transmitted by the base station, and determines the allocation unit of the UE frequency resource through indication of the higher layer signaling; another determining way includes that the allocation unit of the UE frequency resource is determined according to the pre-configuration, e.g., according to a specification; another determining way includes that the allocation unit of the frequency resource is determined according to the bandwidth of all the frequency resources for the resource allocation in the DCI of the second type search space.

The UE performs the blind detection for the PDCCH of the second type search space according to the determined resource allocation indicating way, obtains the bandwidth and the location of the uplink resource actually allocated for the UE and the bandwidth and the location of the downlink resource actually allocated for the UE. The number of the blind detections performed for the PDCCH/EPDCCH of the second type search space by UE is configured through the higher layer signaling, or is preset through the specification. The PDCCH/EPDCCH format of the PDCCH/EPDCCH which is blindly detected by the UE in the second type search space (including the number of bits included in the PDCCH/EPDCCH) is configured by the higher layer signaling, or is preset by the specification.

Second Way:

The second type search space includes two configuration transmission modes, one is referred to as a fallback transmission mode (e.g., a DCI format 1A), and the other one is referred to as a non-fallback transmission mode (e.g., a DCI format 1D, a DCI format 2, a DCI format 2A).

For the fallback transmission mode, the UE directly takes the resource allocation indicating way in the DCI of the first type search space as the resource allocation indicating way in the DCI of the specific search space, i.e., the resource allocation indicating way in the DCI of the first type search space and the DCI of the second type search space are same.

Since the second type search space includes the fallback transmission mode and the non-fallback transmission mode, the second type search space is the UE specific search space, and further includes the UE-group search space, the UE-group search space is for a group of UEs, e.g., a power control command is transmitted through the UE-group search space, or some indications are transmitted through the UE-group search space, or some data may be scheduled, e.g., for system reconfiguration, the data transmitted in the search space is small, in order to reduce the number of times of blind detection, the fallback transmission mode in the UE specific search space and the UE-group search space may use a same DCI format as far as possible. Resource allocation indicating ways for these search spaces are described as below.

For the fallback transmission mode, the transmission mode is mainly used for system reconfiguration, the scheduled data is small, in addition, the mode requires high reliability for DCI transmission, thus, the bandwidth of the resource may be small, and the number of bits for resource allocation is small, however, the central frequency may be same, when the UE detects simultaneously the two transmission modes, implementation complexity is small, and a resource allocation unit (i.e., RBG) may be same with the non-fallback transmission mode. For the non-fallback mode, the frequency resource allocated for the UE is greatly large, when the allocation unit of the frequency resource same with the fallback transmission mode is used, the number of the bits of the frequency resource allocation indication is greatly large, thus, the frequency resource allocation unit of the UE for the non-fallback transmission mode may be greatly large, thus, bits used for the frequency resource allocation indication may be saved. Time for switching between different search spaces may be reduced because the central frequency is same.

In addition, since the UE receives a UE-group common command, e.g., a UE-group power control command, the UE-group power control command is received every time slot, since the number of bits of the UE-group DCI is small, in order to reduce the complexity that the UE blindly detects the DCI, the number of bits of the DCI for the fallback transmission mode may be same as that of the UE-group DCI. Thus, the fallback transmission mode may use the UE specific search space.

Thus, the bandwidth of the frequency resource and the frequency resource allocation unit of the UE for the fallback transmission mode may be determined independently from the bandwidth of the frequency resource and the frequency resource allocation unit of the UE for the non-fallback transmission mode, e.g., configuration is performed through independent higher layer signaling. The number of bits of DCI of the UE-group search space is similar as that of the UE specific search space, and only one search space may be used, so as to further reduce the number of times of blind detection.

For the non-fallback transmission mode, the determining way for the bandwidth and the location of all the frequency resources available for the UE frequency resource allocation in the resource allocation indicating way includes that: the UE receives the higher layer signaling transmitted by the base station, obtains the bandwidth (referred as to the system bandwidth) and the location of all the frequency resources available for the resource allocation in the DCI of the second type search space through the indication of the higher layer signaling, e.g., the configuration information through the higher layer signaling indicates that the system bandwidth available for the DCI of the second type search space is 110 PRBs, the configuration information through the higher layer signaling further indicates the location of the 110 PRBs, and the bandwidth of each PRB is 180 kHz. The allocation unit of the UE frequency resource in the resource allocation indicating way may be determined according to the higher layer signaling transmitted by the base station, or may be determined according to the pre-configuration (e.g., may be preset according to the specification).

The UE perform the blind detection for the PDCCH of the second type search space according to the determined resource allocation indicating way, obtains the bandwidth and the location of the uplink resource actually allocated for the UE and the bandwidth and the location of the downlink resource actually allocated for the UE.

Third Way:

In this way, a resource allocation way for the DCI of the second type search space may be determined same as that for the first type search space.

Alternatively, when the resource allocation indicating way for the DCI of the second type search space is not determined according to a preset way, e.g., when the UE does not receive the higher layer signaling used for indicating the resource allocation indicating way in the DCI of the second search space, the resource allocation indicating way in the DCI of the second type search space is determined same as the resource allocation indicating way in the DCI of the first type search space.

During the processing above, the resource allocation indicating way in the DCI of the first type search space and the resource allocation indicating way in the DCI of the second type search space are basically independent from each other. Two ways are provided below, in which the resource allocation indicating way in the DCI of the first type search space and the resource allocation indicating way in the DCI of the second type search space are respectively indicated through the common signaling or the initial access information indication.

First Way:

The UE receives the common signaling or the initial access information transmitted from the base station to the UE, and obtains bandwidths (referred as to system bandwidth) and locations of all frequency resources for two or more than two resource allocations. A bandwidth (referred as to system bandwidth) and a location of all frequency resources for a resource allocation are used for the resource allocation in the DCI of the first type search space, and are taken respectively as the bandwidth and the location of all the frequency resources available for the UE frequency resource allocation in the DCI of the first type search space. Which resource allocation is used for the DCI of the first type search space may be determined through the common signaling or the initial access information, or may be determined through the pre-configuration. For the resource allocation in the DCI of the second type search space, a resource allocation may be selected from the two or more than two resource allocations obtained by using the common signaling or the initial access information according to a preset regulation, and the bandwidth and the location of all the frequency resources for the resource allocation is taken as the bandwidth and the location of all the frequency resources available for the UE frequency resource allocation in the second type search space. The detail preset regulation may be set according to requirements, e.g., the preset regulation may include that the resource allocation the bandwidth of all the frequency resources of which is largest, and is smaller than or equal to a maximum frequency bandwidth supported by the UE.

The allocation unit of the UE frequency resource in the DCI of the first type search space and the allocation unit of the UE frequency resource in the DCI of the second type search space may be determined according to the pre-configuration (e.g., a fixed allocation unit of the UE frequency resource is preset in a specification), or may be determined according to the common signaling or the initial access information above. In particular, when the bandwidths (referred as to the system bandwidth) and the locations of all the frequency resources for the two or more than two resource allocations are obtained from the common signaling or the initial access information, the allocation unit of the UE frequency resource in the two or more than two resource allocations is indicated at the same time. Based on this, for the resource allocation used for the DCI of the first type search space, the allocation unit of the UE frequency resource for the resource allocation is taken as the allocation unit of the UE frequency resource in the DCI of the first type search space; for the resource allocation used for the DCI of the second type search space, the allocation unit of the UE frequency resource for the resource allocation is taken as the allocation unit of the UE frequency resource in the DCI of the second type search space.

It can be seen from above that, the frequency information of two or more than two resource allocation is obtained according to the indication of the common signaling or the initial access information, the frequency information may include the bandwidth and the location of all the frequency resources, preferably, further includes the allocation unit of the UE frequency resource.

Second Way:

The UE receives the common signaling and the initial access information transmitted from a base station to the UE, obtains the frequency information of the two or more resource allocations through the common signaling and the initial access information. The frequency information of the resource allocation is same as that in the first way above, which is not described repeatedly herein. For the resource allocation indicating way in the DCI of the first type search space, the determining way is same as that for the first type search space in the first way above, which is not described repeatedly herein.

For the second type search space, the DCI includes two configuration transmission modes, one is referred to as a fallback transmission mode (e.g., DCI format 1A), and the other is referred to as a non-fallback transmission mode (e.g., DCI format 1D, DCI format 2, DCI format 2A).

For the fallback transmission mode, the resource allocation indicating way in the DCI of the second type search space is determined same as the resource allocation indicating way in the DCI of the first search space.

For the non-fallback transmission mode, the resource allocation indicating way is determined same as the resource allocation indicating way in the DCI of the second search space in the first way above, which is not repeatedly described herein.

According to the multiple ways described above, the resource allocation indicating way in the DCI of the first type search space and the second type search space can be determined. Next, according to the determined resource allocation indicating ways, the DCI detection way is determined, i.e., in the first type search space and the second type search space, the PDCCH/EPDCCH is blindly detected according to the corresponding resource allocation indicating way. Lastly, according to a blind detection result, the bandwidth and the location of the uplink and/or downlink resources actually allocated for the UE are determined.

Embodiment 2

There are two methods for indicating a frequency resource in DCI. A method includes performing indication through one step, i.e., the number and locations of PRBs in allocated system bandwidth or configured bandwidth are directly indicated, Another method includes performing indication through two steps together, in a first step, a sub-bandwidth (also referred to as band part (BP)) in the system bandwidth or the configured bandwidth is indicated, in a second step, the number and the locations of the PRBs in the BP indicated in the first step are indicated. For the UE supporting limited bandwidth, by using the method that two steps are performed together to indicate the frequency resource can save information bit overhead. The one or more sub-bandwidths may be indicated in the first step, when multiple sub-bandwidths are indicated, the number and the locations of the PRBs in each BP are indicated in the second step.

It is described below whether a one-step way or a two-step way is used for the resource allocation in the DCI of the first type search space or the DCI of the second type search space.

There are some methods for the DCI of the first type search space.

Method 1:

A one-step indicating way is used for allocating a frequency resource for scheduling a PUSCH or a PDSCH in the DCI of the first type search space. Since different UEs supports different bandwidth capabilities, and a base station may not know a bandwidth capability supported by a UE just accessing a system, it is not required for the UE to use the two-step indicating way. An allocation unit of the frequency resource of the UE and bandwidths and locations of all frequency resources available for frequency resource allocation of the UE may be obtained through a method in embodiment 1.

Actually, the processing in the method is to independently perform a corresponding processing way in embodiment 1 above.

Method 2:

A two-step indicating way is used for allocating a frequency resource for scheduling a PUSCH or a PDSCH in the DCI of the first type search space. In a first step, at least one BP indicated by the DCI is determined, wherein the number of the PRBs included in the BP is preset through a specification, or is indicated through system information (the system information herein includes a main system block (MIB) or a system information block (SIB)). The number of the PRBs occupied by each BP in the first step and locations of the PRBs may be preset through a specification, or is indicated through system information (the system information herein includes a MIB or a SIB), or is deduced through system bandwidth (or determined according to minimum bandwidth). In a second step, a resource allocation indicating way for each BP in the first step is determined, wherein an allocation unit of a frequency resource of the UE in each BP and bandwidths and locations of all frequency resources available for frequency resource allocation of the UE may be obtained through the method in embodiment 1.

The processing in the method is to increase sub-bandwidth indicating processing based on the processing above in embodiment 1, accordingly, a resource allocation indicating way in the DCI of the first type search space in embodiment 1 is a resource allocation indicating way in a corresponding sub-bandwidth.

Method 3:

One of the one-step indicating way and the two-step indicating way is used for allocating a frequency resource for scheduling a PUSCH or a PDSCH in the DCI of the first type search space through system information indication or by high layer signaling configuration. When the two-step indicating way is used, in a first step, at least one BP indicated in the DCI is determined. The number of the PRBs included in the BP is preset in specification, or is indicated by the system information (the system information herein includes a MIB or a SIB), or is deduced according to the system bandwidth. In a second step, a resource allocation indicating way in each BP in the first step is determined, wherein an allocation unit of a frequency resource of the UE in each BP and bandwidths and locations of all frequency resources available for frequency resource allocation of the UE may be obtained through the method in embodiment 1.

For the first type search space, the UE may presets the BP used for PDSCH transmission of the first type search space through specifications, or determines the BP used for PDSCH transmission of the first type search space according to system bandwidth, a system frequency band range, etc., when there are multiple BPs, information in MIB indicates which BP is scheduled for the PDSCH transmission by the DCI of the first type search space, or the BP scheduled for the PDSCH transmission by the DCI of the first type search space is the BP where the PBCH and the synchronization signaling is located.

For the first type search space, the BP for DCI transmission may be the BP where the PBCH and the synchronization signaling is located, or may be information indication in the MIB.

For the first type search space, the BP for DCI transmission may be in a same BP with the transmission of the PDSCH scheduled by the DCI of the first type search space, thus, the BP where the PDSCH is located may be not directly indicated in the DCI, implementation according to this method is simple; when the BP for DCI transmission may be not in the same BP with the transmission of the PDSCH scheduled by the DCI of the first type search space, the BP where the PDSCH is located may be directly indicated in the DCI, according to this method, frequency diversity gain may be improved through scheduling according to performance of different BPs.

There are some methods for the DCI of the second type search space.

Method 1:

A two-step indicating way is used for allocating a frequency resource for scheduling a PUSCH or a PDSCH in the DCI of the second type search space. In a first step, at least one BP indicated by the DCI is determined, wherein the number of the PRBs included in the BP is preset through a specification, or is indicated through system information (the system information herein includes a main system block (MIB) or a system information block (SIB)), or is deduced through system bandwidth, or is configured through high layer signaling. In a second step, a resource allocation indicating way in each BP in the first step is determined, wherein an allocation unit of a frequency resource of the UE in each BP and bandwidths and locations of all frequency resources available for frequency resource allocation of the UE may be obtained through the method in embodiment 1.

The processing in the method is to increase sub-bandwidth indicating processing based on the processing above in embodiment 1, accordingly, a resource allocation indicating way in the DCI of the second type search space in embodiment 1 is a resource allocation indicating way in a corresponding sub-bandwidth.

For the second search space, the UE may receive higher layer signaling to determine to configure at least one BP for the UE, when multiple BPs are configured for the UE, by receiving physical layer signaling or Media Access Control layer signaling, it is determined which configured BP is activated, e.g., the UE is configured with three BPs, BP1, BP2, BP3, since bandwidth processing of the UE is limited, the UE may activate one of the BP1, BP2, BP3 through the physical layer signaling or the Media Access Control layer signaling.

Method 2:

One of the one-step indicating way and the two-step indicating way is used for allocating a frequency resource for scheduling a PUSCH or a PDSCH in the DCI of the second type search space through high layer signaling configuration. When the two-step indicating way is used, in a first step, at least one BP indicated in the DCI is determined. The number of the PRBs included in the BP is preset in specification, or is indicated by the system information (the system information herein includes a MIB or a SIB), or is deduced according to the system bandwidth, or is configured through high layer signaling. In a second step, a resource allocation indicating way in each BP in the first step is determined, wherein an allocation unit of a frequency resource of the UE in each BP and bandwidths and locations of all frequency resources available for frequency resource allocation of the UE may be obtained through the method in embodiment 1. When the one-step way is used, an allocation unit of a frequency resource of the UE in each BP and bandwidths and locations of all frequency resources available for frequency resource allocation of the UE may be obtained through the method in embodiment 1.

Method 3:

For the second type search space, there are two kinds of transmission configuration mode for the DCI, one may be referred to as backoff transmission mode (e.g., DCI format 1A), the other one may be referred to as non-backoff transmission mode (e.g., DCI format 1D, DCI format 2, DCI format 2A, etc.).

For the backoff transmission mode, the two-step indicating way is used for allocating a frequency resource for scheduling a PUSCH or a PDSCH in the DCI of the second type search space. In a first step, at least one BP indicated by the DCI is determined, wherein the number of the PRBs included in the BP is preset through a specification, or is indicated through system information (the system information herein includes a MIB or a SIB), or is deduced through system bandwidth, or is configured through high layer signaling. In a second step, a resource allocation indicating way for each BP in the first step is determined, wherein an allocation unit of a frequency resource of the UE in each BP and bandwidths and locations of all frequency resources available for frequency resource allocation of the UE may be obtained through the method in embodiment 1.

For the non-falloff transmission mode, one of the one-step indicating way and the two-step indicating way is used for allocating a frequency resource for scheduling a PUSCH or a PDSCH in the DCI of the second type search space through high layer signaling configuration. When the two-step indicating way is used, in a first step, at least one BP indicated in the DCI is determined, wherein the number of the PRBs included in the BP is preset in specification, or is indicated by the system information (the system information herein includes a MIB or a SIB), or is deduced according to the system bandwidth, or is configured through high layer signaling. In a second step, a resource allocation indicating way in each BP in the first step is determined, wherein an allocation unit of a frequency resource of the UE in each BP and bandwidths and locations of all frequency resources available for frequency resource allocation of the UE may be obtained through the method in embodiment 1. When the one-step way is used, an allocation unit of a frequency resource of the UE in each BP and bandwidths and locations of all frequency resources available for frequency resource allocation of the UE may be obtained through the method in embodiment 1.

Figure 4:
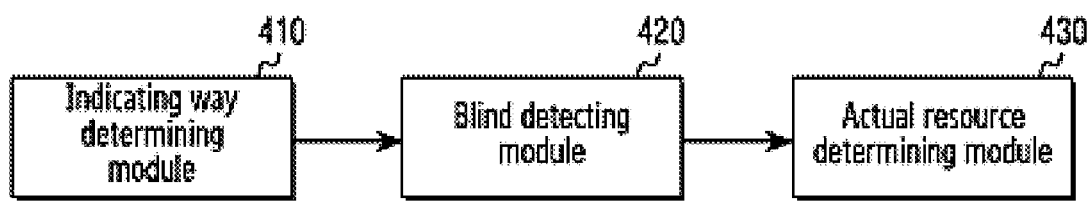
FIG. 4 is a schematic diagram illustrating a structure of an uplink and downlink resource scheduling apparatus according to the present disclosure.

The detail implementation for the resource scheduling method according to the present disclosure has been described above. The present disclosure further provides a resource scheduling apparatus. FIG. 4 is a schematic diagram illustrating a basic structure of the apparatus. As shown in FIG. 4, the apparatus includes: an indicating way determining module 410, a blind detecting module 420 and an actual resource determining module 430.

The indicating way determining module 410 is configured to determine a resource allocation indicating way in DCI of a first type search space and a resource allocation indicating way in the DCI of a second type search space, wherein the resource allocation indicating way comprises an allocation unit of a UE frequency resource and a bandwidth and a location of all frequency resources available for UE frequency resource allocation. The blind detecting module 420 is configured to in the first type search space and the second type search space, perform blind detection for PDCCH/EPDCCH on the bandwidth and the location of all the frequency resources available for the UE frequency resource allocation in the corresponding resource allocation indicating way according to the allocation unit of the UE frequency resource in the corresponding resource allocation indicating way. And the actual resource determining module 430 is configured to determine a bandwidth and a location of an uplink resource and/or a downlink resource actually allocated for the UE.

Figure 5:
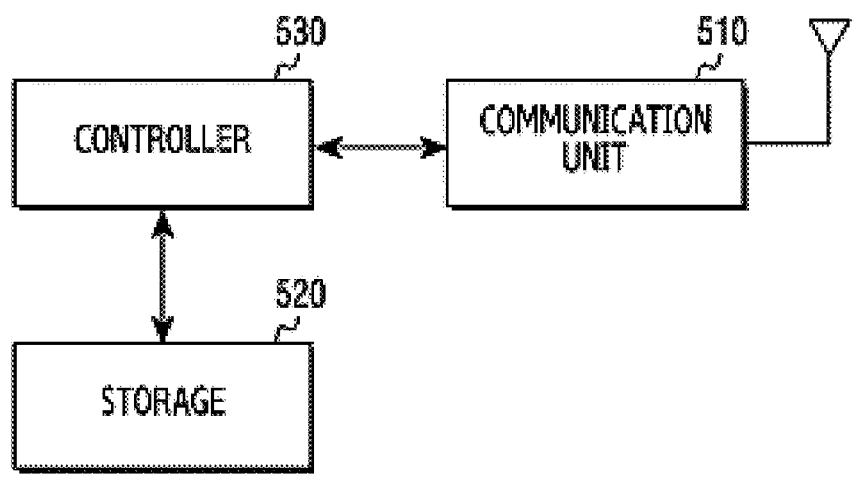
FIG. 5 is an example configuration of a terminal in a wireless communication system according to an exemplary embodiment of the disclosure.

FIG. 5 illustrates an example configuration of a terminal in a wireless communication system according to an exemplary embodiment of the disclosure. FIG. 5 illustrates an example of a configuration of the apparatus of FIG. 4 or the UE. Hereinafter, the term "unit" or the term ending with the suffix "-er" or "-or" refer to a unit for processing at least one function or operation and these terms may be implemented by using hardware or software or a combination of hardware and software. Referring to FIG. 5, the terminal includes a communication unit 510, a storage 520, and a controller 530.

The communication unit 510 performs functions for transmitting and receiving signals via a radio channel. For example, the communication unit 510 performs a function of converting between a baseband signal and a bit string according to a physical layer standard of a system. For example, when transmitting data, the communication unit 510 generates complex symbols by encoding and modulating a transmission bit string. In addition, when receiving data, the communication unit 510 restores a reception bit string by demodulating and decoding a baseband signal. In addition, the communication unit 510 up-converts a baseband signal into an RF band signal and then transmit the RF band signal through an antenna, and down-converts an RF band signal received through the antenna into a baseband signal. For example, the communication unit 510 may include a transmission filter, a reception filter, an amplifier, a mixer, an oscillator, a DAC, an ADC, or the like.

The communication unit 510 transmits and receives signals as described above. Accordingly, the communication unit 510 may be referred to as a transmission interface, a reception interface, a transmission and reception interface, a transmitter, a receiver or a transceiver. In addition, in the following description, transmitting and receiving performed through a radio channel may include processing by the communication unit 510 as described above.

The storage 520 stores data such as a basic program for the operation of the terminal, an application program, setting information, or the like. The storage 520 may be configured by a volatile memory, a nonvolatile memory, or a combination of a volatile memory and a nonvolatile memory. In addition, the storage 520 provides stored data in response to a request of the controller 530.

The controller 530 controls overall operations of the terminal. For example, the controller 530 transmits and receives signals through the communication unit 510. In addition, the controller 530 records and reads data on and from the storage 520. To achieve this, the controller 530 may include at least one processor or microprocessor or may be a part of the processor. In addition, a part of the communication unit 510 and the controller 530 may be referred to as a communication processor (CP). In particular, the controller 530 may perform D2D signaling for positioning of the terminal and may measure information related to the D2D signal according to various exemplary embodiments which will be described below. For example, the controller 530 may control the terminal to perform a procedure according to various exemplary embodiments which will be described below. The controller 530 may comprises at least one of the indicating way determining module 410, a blind detecting module 420 and an actual resource determining module 430.

The foregoing is only preferred examples of the present invention and is not used to limit the protection scope of the present invention. Any modification, equivalent substitution and improvement without departing from the spirit and principle of the present invention are within the protection scope of the present invention.

What is claimed is:

1. A method for operating a user equipment (UE) in a wireless communication system, the method comprising:
   receiving, from a base station, first information on a number of at least one bandwidth part (BWP) and second information associated with at least one BWP identifier;
   receiving, from the base station, downlink control information (DCI) including an indicator and resource information;
   identifying frequency domain resources based on the resource information and a BWP indicated by the indicator in the DCI from among the at least one BWP according to the second information, wherein each of the at least one BWP corresponds to each of the at least one BWP identifier, and the indicator in the DCI indicates one of the at least one BWP identifier; and
   transmitting uplink data on a physical uplink shared channel (PUSCH) using the frequency domain resources,
   wherein the at least one BWP identifier is configured to at least one of values from 1 to a maximum number of BWPs for the UE.

2. The method of claim 1, wherein the at least one BWP comprises a first BWP for a first type search space excluding a second BWP for a second type search space indicated in system information.

3. The method of claim 2, wherein the DCI is received in the first type search space.

4. The method of claim 2, wherein, when the DCI is received in the second type search space, the at least one BWP includes the second BWP indicated in the system information.

5. The method of claim 1, further comprising:
   receiving information for a resource block group corresponding to the frequency domain resources.

6. A user equipment (UE) in a wireless communication system, the UE comprising:
   at least one transceiver; and
   at least one processor operably coupled to the at least one transceiver, and configured to:
      receive, from a base station, first information on a number of at least one bandwidth part (BWP) and second information associated with at least one BWP identifier,
      receive, from the base station, downlink control information (DCI) including an indicator and resource information,
      identify frequency domain resources based on the resource information and a BWP indicated by the indicator in the DCI from among the at least one BWP according to the second information, wherein each of the at least one BWP corresponds to each of the at least one BWP identifier, and the indicator in the DCI indicates one of the at least one BWP identifier, and
      transmit uplink data on a physical uplink shared channel (PUSCH) using the frequency domain resources,
   wherein the at least one BWP identifier is configured to at least one of values from 1 to a maximum number of BWPs for the UE.

7. The UE of claim 6, wherein the at least one BWP comprises a first BWP for a first type search space excluding a second BWP for a second type search space indicated in system information.

8. The UE of claim 7, wherein the DCI is received in the first type search space.

9. The UE of claim 7, wherein, in case of the DCI received in the second type search space, the at least one BWP includes the second BWP indicated in the system information.

10. The UE of claim 6, wherein the at least one processor is further configured to:
    receive information for a resource block group corresponding to the frequency domain resources.

* * * * *